US009567191B2

(12) United States Patent
Fried et al.

(10) Patent No.: US 9,567,191 B2
(45) Date of Patent: Feb. 14, 2017

(54) ELEVATOR INSTALLATION WITH LIGHTWEIGHT GLASS PLATE

(75) Inventors: Andreas Fried, Potsdam (DE); Gert Silberhorn, Merlischachen (CH); Michael Gelsshusler, Luzern (CH); Nicolas Gremaud, Richterswil (CH)

(73) Assignee: Inventio AG, Hergiswil (CH)

( * ) Notice: Subject to any disclaimer, the term of this patent is extended or adjusted under 35 U.S.C. 154(b) by 997 days.

(21) Appl. No.: 13/061,846

(22) PCT Filed: Aug. 20, 2009

(86) PCT No.: PCT/EP2009/060762
§ 371 (c)(1),
(2), (4) Date: Jun. 1, 2011

(87) PCT Pub. No.: WO2010/026050
PCT Pub. Date: Mar. 11, 2010

(65) Prior Publication Data
US 2011/0272219 A1    Nov. 10, 2011

(30) Foreign Application Priority Data
Sep. 2, 2008    (EP) .................................. 08163516

(51) Int. Cl.
*B66B 11/02*    (2006.01)
*B66B 13/30*    (2006.01)
(Continued)

(52) U.S. Cl.
CPC ....... *B66B 13/303* (2013.01); *B32B 17/10036* (2013.01); *B32B 17/10293* (2013.01);
(Continued)

(58) Field of Classification Search
CPC .......... B66B 13/22; B66B 11/02; B66B 5/005; B66B 17/10036; B66B 13/30; B66B 3/00; B66B 17/10302
(Continued)

(56) References Cited

U.S. PATENT DOCUMENTS 1,929,892 A * 10/1933 Kellner ........................... 49/367
7,832,160 B2 * 11/2010 Farag .............................. 52/235
(Continued)

FOREIGN PATENT DOCUMENTS

EP         1878864 A2    1/2008
JP       2008019065 A * 1/2008
(Continued)

OTHER PUBLICATIONS

English Machine Translation of JP 2008-19065 A.*
Another English Translation of JP 2008-19065 A.*

*Primary Examiner* — William E Dondero
*Assistant Examiner* — Diem Tran
(74) *Attorney, Agent, or Firm* — Fraser Clemens Martin & Miller LLC; William J. Clemens

(57) ABSTRACT

A lightweight glass plate includes a first glass plate, a second glass plate and an intermediate layer that connects the first and the second plates together. The lightweight glass plate further includes at least one connection element that allows the lightweight glass plate to be connected to an abutting component. The connection element is embedded into the intermediate layer in an edge area of the lightweight glass plate and the intermediate layer extends to surfaces located between the connection element and the glass plates. The lightweight glass plate is preferably used in the preparation of elevator doors and/or car walls. The lightweight glass plates are lightweight and can transfer large forces.

16 Claims, 9 Drawing Sheets

(51) Int. Cl.
    *B32B 17/10*    (2006.01)
    *E06B 3/46*     (2006.01)
(52) U.S. Cl.
    CPC .... *B32B 17/10302* (2013.01); *B66B 11/0253* (2013.01); *E06B 3/4681* (2013.01)
(58) Field of Classification Search
    USPC .................. 187/325, 333, 334, 313, 336, 401,187/390–391; 52/325
    See application file for complete search history.

(56) References Cited

U.S. PATENT DOCUMENTS

| | | | |
|---|---|---|---|
| 7,992,687 B2* | 8/2011 | Yumura et al. | 187/316 |
| 2005/0105303 A1* | 5/2005 | Emde | 362/616 |
| 2005/0166496 A1* | 8/2005 | Farag | 52/204.57 |
| 2011/0267833 A1* | 11/2011 | Verrat-Debailleul et al. | 362/545 |

FOREIGN PATENT DOCUMENTS

| | | |
|---|---|---|
| WO | 2006091308 A2 | 8/2006 |
| WO | WO 2007108089 A1 * | 9/2007 |

* cited by examiner

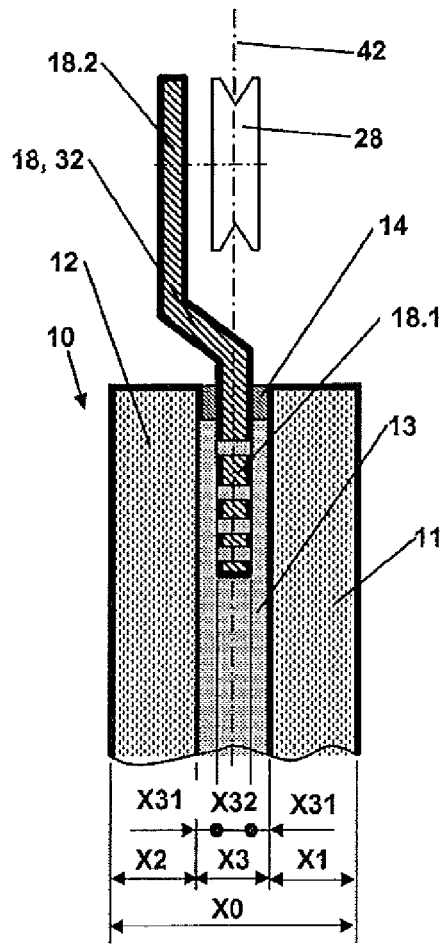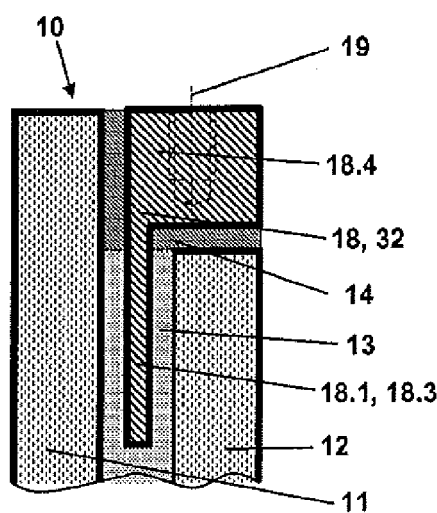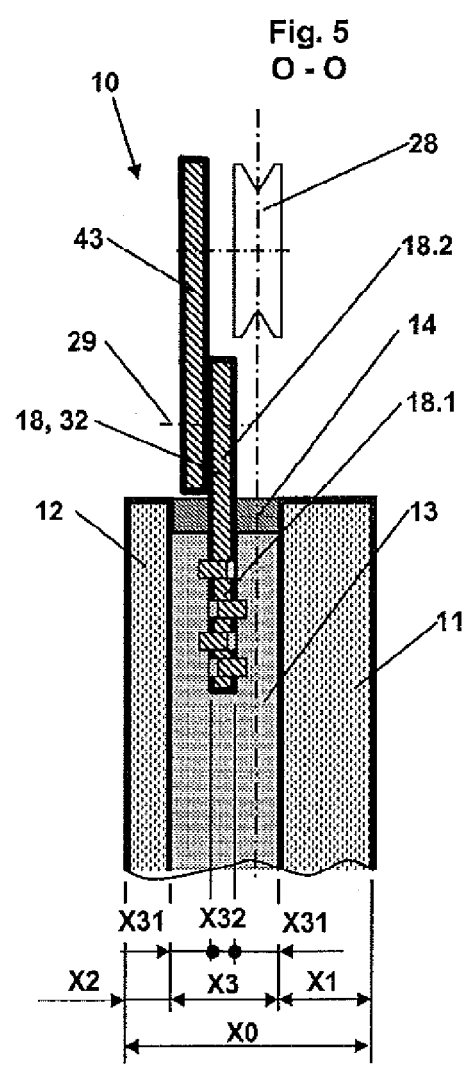

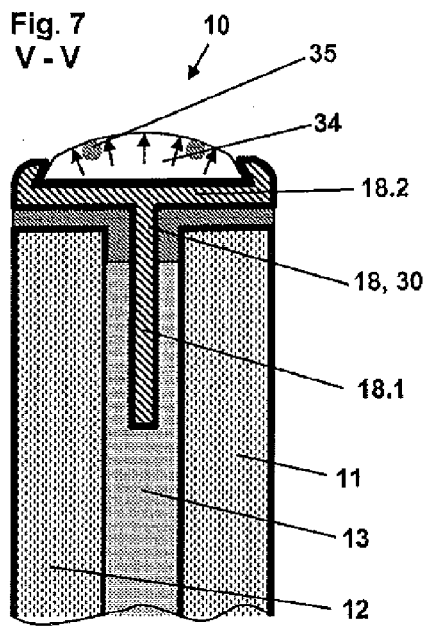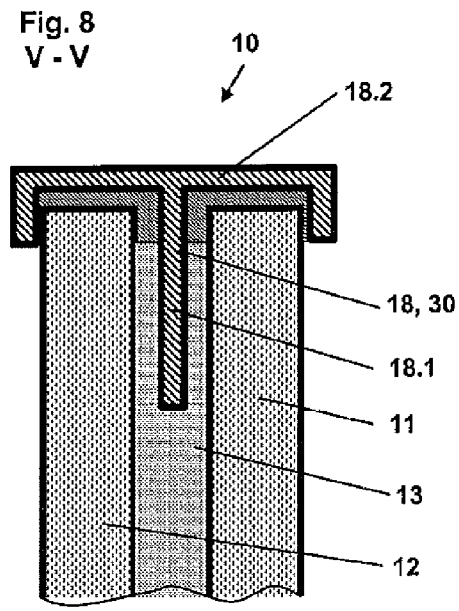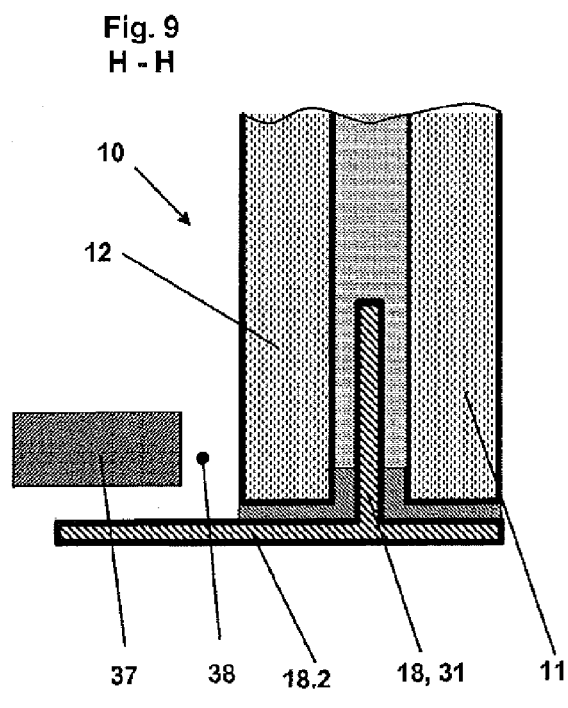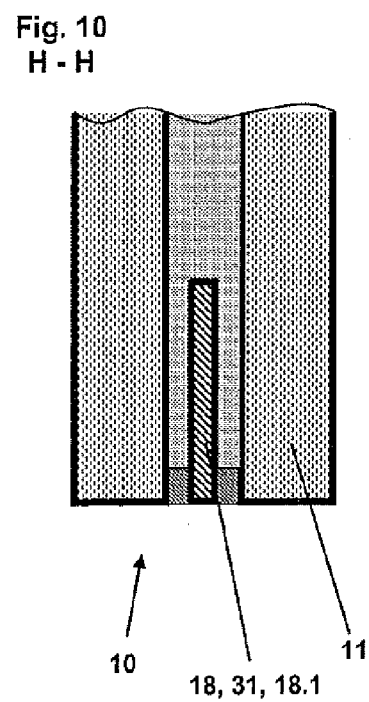

U - U

U - U

ELEVATOR INSTALLATION WITH LIGHTWEIGHT GLASS PLATE

FIELD

The invention relates to an elevator installation with a glass structure in at least one of a car, a car door and a shaft door.

BACKGROUND

The elevator installation consists substantially of a car which is connected with a counterweight by way of support means. The car is moved along a substantially vertical car travel path along a shaft front wall by means of a drive, which selectably acts on the support means or directly on the car or the counterweight. The car travel track is usually integrated in a building in a shaft. The shaft is bounded by at least one shaft front wall and by further shaft walls, shaft ceiling and shaft floor. The shaft front wall as well as if required further shaft walls have openings through which the shaft or the car arranged in the shaft can be entered. These shaft openings are closable by means of shaft doors. The car has in turn car doors which free or close access to the car from time to time in co-operation with the shaft doors. The car travel track can also be merely attached to the building or a corresponding building structure, wherein parts of the shaft walls, shaft ceiling and shaft floor are superfluous or can be defined by non-solid materials. The glass structure is used as part of the car, as part of the car door or as part of the shaft door.

Glass structures are known. Thus, EP 0665181 shows glass elements for elevators, wherein the glass elements are inserted in frames and held by these. Glass elements of that kind are heavy and the frame constructions are similarly heavy and complicated to produce. Illustrated in EP 0472845 are glass elements which are provided with holes and which can be connected with further components by way of these holes. These glass elements are again heavy and the use of holes or bores in the glass plates obliges complicated and aesthetically unsatisfactory connecting elements. Further glass elements for use in buildings and building structures are known from WO 2006/091308 in which insert parts are inserted in edge region zones of the glass elements. The glass plates are composite plates with an intermediate film. The insert parts are matched by means of intermediate layers to a thickness of the intermediate space determined by the film. Forces acting on the insert part are introduced into regions of the insert part in the glass plates.

The object is now set of providing an elevator installation with improved glass structures, which are usable as load-bearing components, are lighter overall and can be worked in aesthetically elegant and functionally appropriate manner.

SUMMARY

An elevator installation with a glass structure, particularly an elevator installation with a car wall of a glass structure or an elevator installation with an elevator door of a glass structure, can be constructed in an aesthetically elegant and functionally appropriate manner. In that case, the glass structure employed includes a first and a second glass plate. An intermediate layer connects the first and the second glass plates together and a connecting element enables connection of the glass structure with an adjoining component. The connecting element is embedded in an edge region of the glass structure with a region in the intermediate layer, wherein the intermediate layer extends on areas between the connecting element and the glass plates or in spaces between the connecting element and the adjoining glass plates.

An intermediate layer, material can penetrate into the space between the areas of the connecting element and the areas of the glass plates and substantially integrally fill this space. In this connection, "substantially integrally" means that that the intermediate layer material fills up the space between the glass plates and in the intermediate region between the connecting elements and the glass plates in a cohesive manner, wherein, however, parts embedded in the material, such as design structures or display elements can still be present. The intermediate layer material connects the connecting element with the glass plates, whereby forces of the connecting element can be introduced into the intermediate layer and thus over a large area into the glass structure. The intermediate layer is of correspondingly thick construction, since it occupies an intermediate space which goes out over the thickness of the connecting element.

The load-bearing capability of the glass structure is determined substantially by the tension and compression forces accepted by the glass plates. This is given particularly when the intermediate layer completely fills up the intermediate space, thus connects the two glass plates to form a common load-bearing unit. The glass structure which now consists of a relatively thick integral and substantially homogenous intermediate layer and two relatively thin glass plates is lighter by comparison with a conventional glass wall of the same thickness. The glass structure is a lightweight glass plate. This has a positive effect, since a car with wall material of that kind is lighter and correspondingly requires less transport energy in operation. A door with a lightweight glass plate of that kind enables higher closing speeds, since with the same movement energy and smaller weight use can be made of higher speeds of movement.

The lightweight glass plate is substantially areal, i.e. length and width dimensions are significantly greater than a thickness dimension. Edge regions of the lightweight glass plate are arranged along the boundary edges at the long and wide sides, wherein, for example, a rectangular lightweight glass plate has four edge regions of that kind.

Advantageously, a thickness of the intermediate layer is formed to be greater than or at least equal to half the thickness of the first or the second glass plate. A weight of a correspondingly constructed lightweight glass plate is reduced by comparison to a known safety glass by approximately 10%. In the case of intermediate layer thickness which is approximately equal to a thickness of one of the glass plates, the weight reduces by approximately 18%.

The weight reduction reduces the required supporting force and drive energy for operating an elevator installation or allows increase in a closing speed of an elevator door, since in the case of doors of that kind a permissible closing energy is defined for safety reasons. In the case of a high closing speed, which is desired for reasons of operational efficiency, high kinetic movement energies result, which is, however, undesired in the event of persons possibly being caught. The movement energy is correspondingly reduced with lightweight glass doors.

Advantageously, the thickness of the intermediate layer corresponds with a material thickness of the connecting element in the edge region of the lightweight glass plate plus double the thickness of a residual intermediate layer, wherein the thickness of the residual intermediate layer is 0.5 millimeters to 2.5 millimeters, advantageously approximately 1.0 millimeter. A residual intermediate layer of at least 0.5 millimeters ensures that a connection force of the connecting element can be transferred into the intermediate layer. In addition, penetration of the intermediate layer into the space of the residual intermediate layer is made possible. A larger residual intermediate layer represents a good area connection and the arrangement is insensitive to deviations in planarity of the connecting element. In every instance the intermediate layer is constructed from an overall homogenous intermediate layer material, which correspondingly substantially integrally fills out the entire intermediate space.

Advantageously, the lightweight glass plate substantially forms a rectangular area, wherein at least two mutually adjoining edge regions of the lightweight glass plate include a connecting element. In that case at least one of the connecting elements is connected by friction couple in a corner region of the rectangular area with the adjacent connecting element. This increases the capability of loading the lightweight glass plate, particularly in the case of arrangements with a free, unfastened lightweight glass plate edge region. Load forces on this edge region are then not conducted away exclusively via the glass composite into the fastened or supported edge regions, but are conducted at least partly also via the connecting element, which is connected in the corner region with the next connecting element, directly to the supported or fastened connecting element. This increases the overall strength of the lightweight glass plate.

The strength of lightweight glass plates of that kind is usually determined by means of the pendulum impact test. In this regard, a mass, which is suspended by way of a pendulum cord, is deflected by a defined pendulum deflection and then allowed to freely impact against the lightweight glass plate. The described lightweight glass plates, particularly with the supplementary connection of connecting elements in the corner regions, are suitable for withstanding the required pendulum masses. In a concrete embodiment three of the four edge regions of the lightweight glass plate include a connecting element and two of the connecting elements are connected in the corner regions of the rectangular area by friction couple with the adjacent third connecting element.

Advantageously, the connecting element is made of metallic material, preferably of aluminum, steel or brass. The connecting element has a first region, which is embedded in the intermediate layer and the connecting element has a further region suitable for connection with the adjoining component. The first region advantageously has a structure, preferably a hole pattern or a surface structure, which makes possible and guarantees a good frictional connection with the intermediate layer. The hole pattern can be constructed in accordance with aesthetic patterns in that, for example, the proportion of the holes towards the pattern interior is large and reduces in the direction of the edge of the edge region or the hole pattern can include a company logo or a corresponding text. It is advantageous that on the one hand a metallic material is suitable in order to accept the required forces and a connecting element of metallic material can be produced by means of various manufacturing processes. This connecting element can, as desired, be produced by means of, for example, bending, punching, extruding or drawing. The form of the first region of the connecting element in this regard enables a good and unchanging introduction of force from the connecting element into the lightweight glass plate.

The first and second glass plates are preferably provided in the edge region with a sealing material, which prevents penetration of moisture into the intermediate layer or into the boundary layer between glass plates and intermediate layer. Sealing materials of that kind are, for example, elastoplastic diffusion-tight materials such as used in the windows industry.

Advantageously, the intermediate layer connects the first and second glass plates together to be substantially resistant to shear. This intermediate layer is made of transparent material, preferably a plastics material, for example an acrylic resin. The intermediate layer is of pourable material. A load-bearing, loadable layer, which connects the two glass plates together at the same time to be resistant to shear, thus arises in the hardened state of the intermediate layer. Through suitable selection of the surface structure of inner sides of the glass plates the transmission of shear force can, in addition, be correspondingly optimized. In this regard the intermediate layer is light and has a high degree of elasticity. The glass plates form the cover layers with known glass-specific surface properties, in particular scratch resistance. A glass sandwich formed in that manner is load-bearing, light and wear-resistant.

Advantageously, the intermediate layer is provided with an inlay. The inlay imparts an optically visible effect. The lightweight glass plate can thus be used as a designer component. The inlay can also be applied as a surface layer, for example in the form of a screen print, on one or both glass plates. Advantageously, this layer is applied directly to a side of the glass plate facing the intermediate layer. The coating or the inlay is thus protected and a three-dimensional effect can be achieved in an advantageous co-operation of two or more layers. The surface layer can also be produced by etching or by means of grinding or engraving the surfaces.

The inlay advantageously selectably includes an image, a sculpture in light, an area-switchable lighting and/or a radiation filter. An elevator forms a visiting card of a building. A light image or a mosaic inserted in the intermediate layer can attract the attention of users. A radiation filter can, for example, filter sunlight and reduce incompatible ultraviolet radiation. An LCD film can also be inserted in the intermediate layer, whereby possibilities of communications technology are opened up. Information can be illustrated or generated. With use of an interactive film, which, for example, responds to pressure, light or capacitive changes, it is also possible to define a communications lightweight glass plate which can take over functions of an elevator control unit.

Advantageously, one of the surfaces of the lightweight glass plate is provided with a dirt-repelling coating, for example a nano-coating. Cleaning effort is thereby reduced.

Further advantageous embodiments of the connecting elements and the edge zones of the lightweight glass plates are explained in the detailed descriptions in conjunction with the figures.

Advantageously, by way of example edge regions or parts of the edge regions of the lightweight glass plate are provided with view and light protective coatings in order to restrict a view of the connecting elements inserted in the intermediate layer. Coatings of that kind are also suitable for protecting edge regions and edges of intermediate layer transitions from light radiation. Embodiments of that kind are advantageously combined with the optical appearance of the lightweight glass plate, as illustrated in the foregoing.

In an advantageous application, car walls are assembled with one or more lightweight glass plates, such as explained within the scope of this description. Car walls of that kind are, by comparison with conventional glass cages or panoramic cars, light in weight and make possible a high level of design freedom for elevator constructors and architects.

Advantageously, the car walls are produced substantially over the whole area from the lightweight glass plate. Complicated frame constructions are thereby eliminated. Alternatively, merely sub-regions of the car wall consist of the lightweight glass plate. This makes it possible for example, to construct side regions with non-transparent materials, such as sheet steel, and to construct a rear wall from glass. The wishes of architects can be fulfilled in a simple manner.

Advantageously, the lightweight glass plate is, in a first application, used as a lateral car boundary. However, it is equally usable as an upper car ceiling or also as a car floor. However, in the case of use of the lightweight glass plate as a car ceiling or even more so as a car floor it is necessary to take into consideration specific anxieties and reactions of persons. In particular, in the case of use as a floor it could be an unpleasant sensation to step from a building floor onto a transparent platform. Thus, in this embodiment it is recommended to form the lightweight glass plate to be non-transparent. Car walls and car ceilings of lightweight glass plates of that kind have, however, also the advantage that ambient light can be used at the same time as car lighting or that vandalism is prevented, since the car interior is observable from outside.

Advantageously, the lightweight glass plates are themselves used as load-bearing structure of the elevator car. In this regard they accept significant forces, such as transverse shear, tension and compression forces. Transverse shear forces arise, for example, in the case of asymmetrical loading of the elevator car, when lateral guiding and supporting forces are introduced by way of the structure of the elevator car from the car floor into upper car guide parts.

In a further advantageous application, elevator doors are assembled with one or more lightweight glass plate such as explained within the scope of this description. Elevator doors are usually moved by means of drive units or opened and closed again according to need. These movements are carried out as quickly as possible so as to structure operating times to be as efficient as possible. On the other hand, a speed and in that case in the first instance the speed during closing of the doors has to be selected so that the door on detection of an obstacle or in the case of impact on an obstacle does not produce any unacceptable loads in the obstacle. This is particularly important in the case of passenger elevators, where the obstacle can be a person. Heavy doors accordingly can be moved only slowly. The illustrated elevator doors include a lightweight glass plate which is light and which can dispense with heavy frame components. The door constructed in that manner is light overall and can be moved correspondingly quickly. Glass doors additionally have the advantage that persons who wish to enter an elevator car already ascertain on approach of the elevator whether, for example, a person wants to leave the car. Time-obstructive confluence of persons with one another, for example during opening of doors, is accordingly eliminated.

Advantageously, both car door and shaft door are constructed by means of lightweight glass plates of that kind. However, buildings are also possible in which merely selected floors are provided with glass doors. Thus, advantageously floors with high levels of confidentiality are provided with non-transparent doors in conventional manner. Obviously, floors of that kind can also be provided with lightweight glass plates, but with a non-transparent intermediate layer or appropriate printing.

An upper connecting element of the lightweight glass plate is advantageously constructed in such a manner that functional parts, such as, for example, door rollers or closing locks, can be fastened to the lightweight glass plate. The upper connecting element is correspondingly anchored by the first region in the intermediate layer formed by the lightweight glass plate and the other end of the upper connecting element directly includes functional parts of the door suspension and locking. In an alternative embodiment the functional parts of the door suspension are indirectly connected with the upper connecting element by way of a carrier plate, which is preferably detachable. This enables provision of doors with few, simply exchangeable subassemblies.

Advantageously, the connecting elements of the lightweight glass plates are shaped appropriately to requirements. Thus, for example, a front connecting element completes the elevator door at the front or in the closing region in elegant manner over the thickness of the glass or if need be it encompasses the lightweight glass plate. The architect can form the shape of the completion optically and functionally. It is advantageous if this front connecting element is provided with a round edge so as to prevent harm to contacted objects and persons.

The connecting element, preferably the front connecting element at the closing side, advantageously includes a sensor for detection of objects in the region of the front edge of the elevator door or the elevator door leaf thereof. This sensor detects the object by means of, for example, force measurement, inductively, capacitively or by means of measurement of sound or light waves. Monitoring of a closing zone of the elevator door can thus be made simple and aesthetically attractive. Additionally or alternatively the front connecting element can be provided with warning elements, such as flashing lights, in order to warn a user when a door is closing.

Advantageously, a rear connecting element, the first region of which is embedded in the intermediate layer of the lightweight glass plate, is constructed in such a manner that a further region projects at least once beyond the thickness of the lightweight glass plate. A gap between the lightweight glass plate and an adjacent door leaf or an adjacent door frame can thereby be closed at least optically. Regulations concerning gap dimensions with moved doors, such as, for example, the elevator standard EN81-1, can thus be fulfilled as required.

The lightweight glass plate used as an elevator door advantageously includes a lower connecting element, the further region of which is used with guide elements for guiding the lightweight glass plate in a guide profile member. Alternatively, the lightweight glass plate can also be directly provided, in the lower region thereof, with slide guide elements for guiding the lightweight glass plate in a guide profile member.

The front and the rear connecting elements are advantageously connected by friction couple at least with the upper connecting element or with the upper and lower connecting elements. Loads on the door field are thus introduced not solely by way of the glass composite into the upper or the lower fastening, but are also directly conducted away over the connecting elements.

Further advantageous embodiments are described in the exemplifying embodiments.

DESCRIPTION OF THE DRAWINGS

The invention is explained in more detail in the following by way of exemplifying embodiments in conjunction with the schematic figures, in which:

FIG. 4 shows a first example of an upper connecting element;

FIG. 5 shows a second example of an upper connecting element;

FIG. 6 shows a third example of an upper connecting element;

FIG. 7 shows a first example of a front connecting element;

FIG. 8 shows a second example of a front connecting element;

FIG. 9 shows a first example of a rear connecting element;

FIG. 10 shows a second example of a rear connecting element;

DETAILED DESCRIPTION

Figure 1:
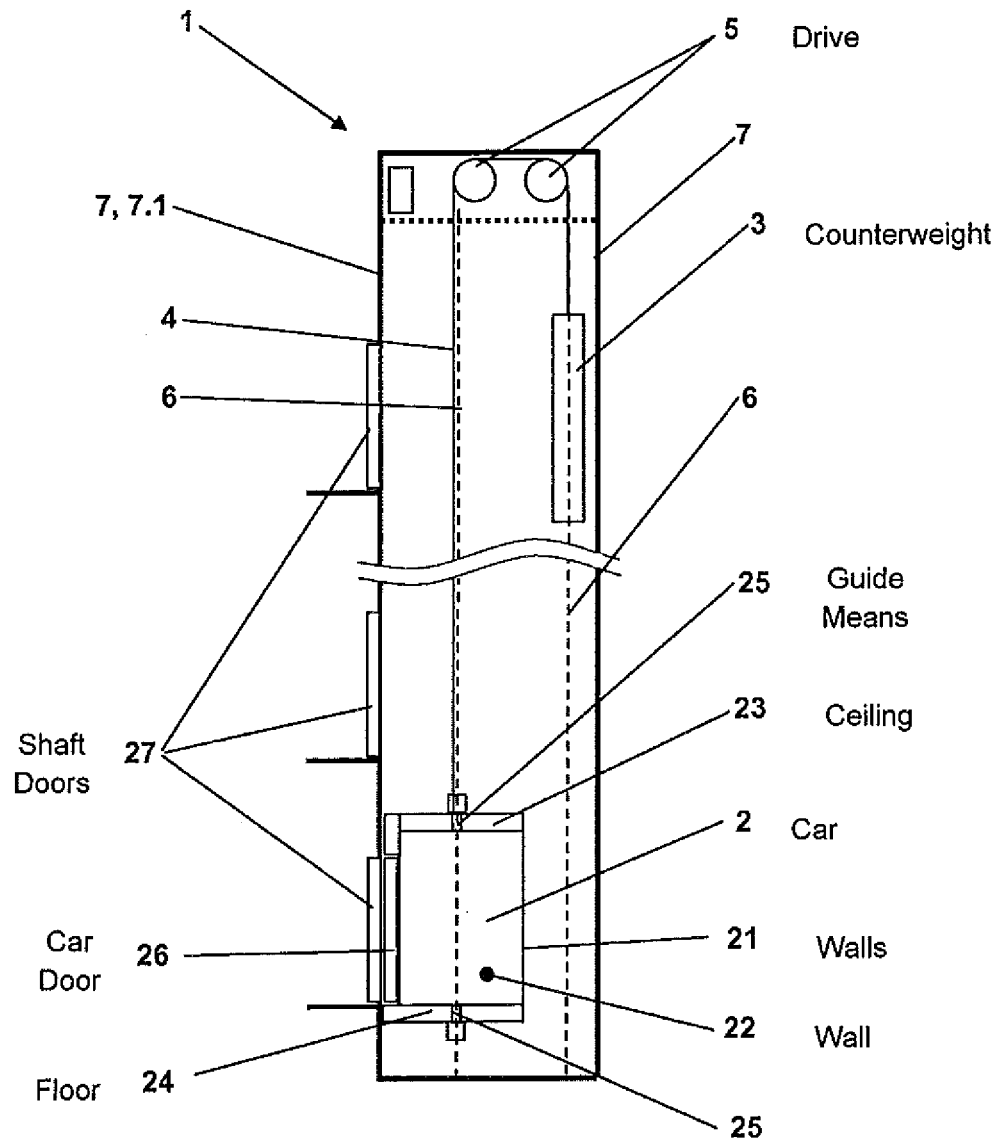
FIG. 1 shows an overall schematic view of an elevator.

One possible overall arrangement of an elevator is illustrated in FIG. 1. The elevator 1 or the elevator installation includes at least one elevator car 2, a drive 5, a counterweight 3 and, in addition, support means 4. The drive 5 drives the support means 4 and thus moves the elevator car 2 and the counterweight 3 in opposite sense. The car 2 is designed to receive persons and/or goods and to transport them between floors of a building. Car 2 and counterweight 3 are guided by means of guides 6. The elevator is installed in a shaft, wherein the shaft is determined substantially by the travel space, which in turn is determined by a travel path of car 2 and counterweight 3. Included therein are possible safety spaces and distances.

The shaft is bounded by shaft walls 7. These shaft walls 7 can, if required, be constructed partly or entirely from lightweight glass plates according to the invention, from other constructional materials or from mixtures of any constructional materials and the lightweight glass plates. The shaft has a shaft wall 7.1 at the floor side. This floor-side shaft wall 7A includes elevator doors or shaft doors 27. These shaft doors 27 enable access to the interior of the shaft for boarding the car 2.

The car 2 is guided by way of guide means 25 along a guide rail 6. The guide means 25 accept lateral guidance forces which result from, for example, an asymmetrically suspended or an asymmetrically laden car.

Moreover, the car 2 similarly includes an elevator door or a car door 26. The car door 26 blocks or permits, in co-operation with the corresponding shaft door 27, access to the car 2 as required.

The car 2 consists substantially of car walls which enclose the transport space. The car walls include a car floor 24, side walls 22, a rear wall 22 and obviously the frontal car door 26, which is integrated in a front wall of the car 2.

In the case of use of shaft walls 7 of lightweight glass plates, preferably also substantial parts of the car are assembled from lightweight glass plates and in the case of use of shaft doors of lightweight glass plates advantageously also the car doors are composed of lightweight glass plates.

Figure 2:
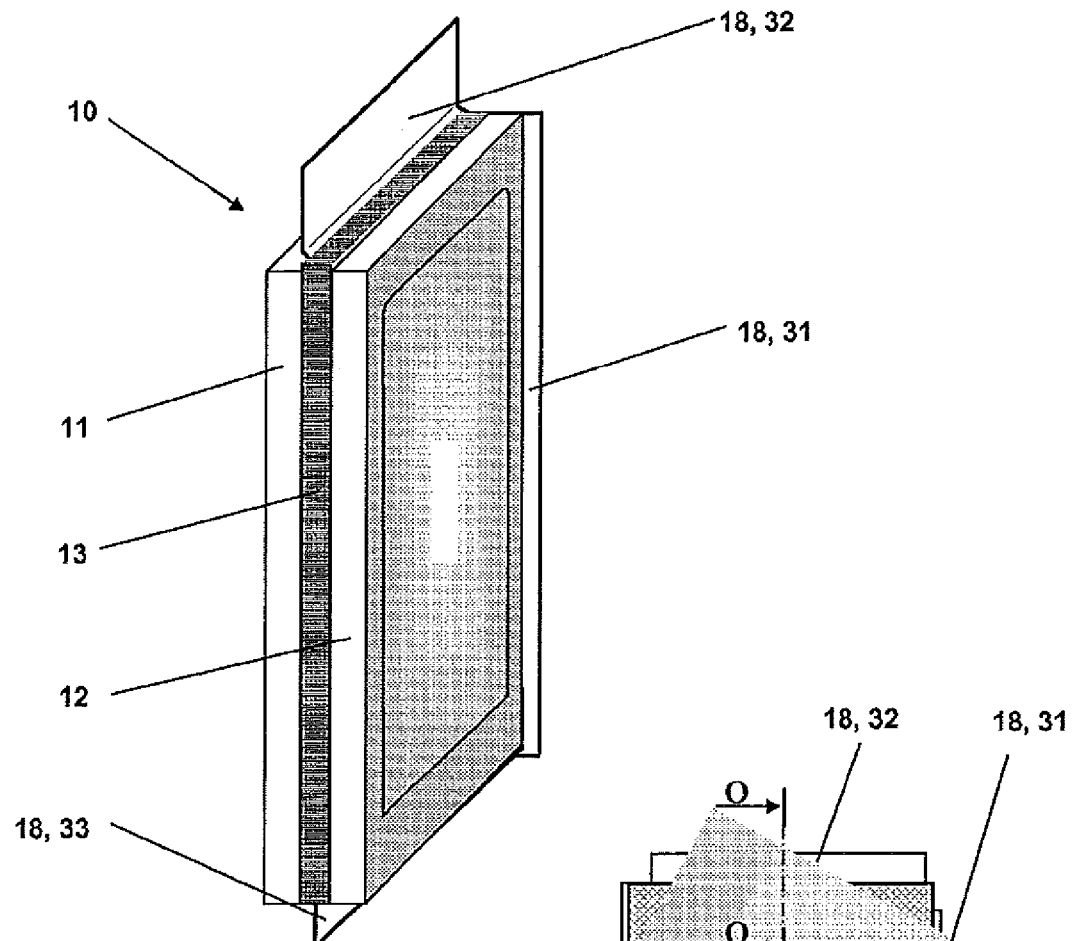
FIG. 2 shows a perspective view of a lightweight glass plate.
Figure 3:
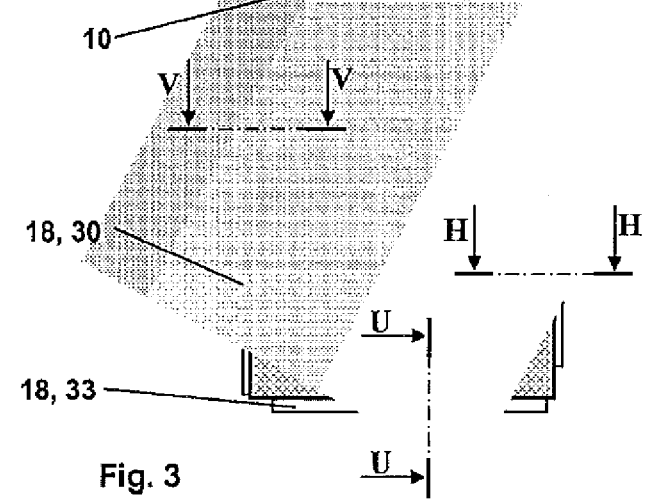
FIG. 3 shows a front view of a lightweight glass plate.

A lightweight glass plate 10 of that kind consists, as illustrated in FIGS. 2 and 3, of a first glass plate 11 and a second glass plate 12. An intermediate layer 13 of castable resin, preferably acrylic resin, substantially integrally fills up the intermediate space between the two glass plates 11, 12. The intermediate layer 13 connects the two glass plates 11, 12 together to be substantially resistant to shear. Connecting elements 18 are placed in the intermediate layer 13 in the edge regions of the glass plates 11, 12. The intermediate layer material also penetrates into the region between connecting element 18 and glass plates 11, 12 and connects the connecting element 18 by means of the intermediate layer 13 with the glass plates 11, 12. The connecting elements 18 are constructed in correspondence with interface requirements, as apparent in the following examples. In the example, a first connecting element 18 is constructed as an upper connecting element 32 and another connecting element 18 is constructed as a rear connecting element 31. The upper connecting element 32 can, for example, be provided with a cranked portion and the rear connecting element 31 can be provided with a free limb, which projects laterally beyond the second glass plate 12.

A further connecting element 18 is constructed as a lower connecting element 33 and a fourth connecting element 18 is constructed as a front connecting element 30. The lower connecting element 33 can be of flat construction and the front connecting element 30 can, for example, be provided with a door edge protection.

The shapes can be defined in correspondence with purpose, wherein symmetrical constructions are also possible. In the case of symmetrical constructions, for example, the lower and the upper or also all connecting elements is or are constructed identically.

The second glass plate 12, which is shown in FIGS. 2 and 3, is printed in the edge region of the lightweight glass plate. The printing prevents viewing of the connecting elements and it also protects the edge region of the lightweight glass plate from harmful radiation.

FIG. 3 illustrates a view of the lightweight glass plate 10 of FIG. 2. Sectional, designations O-O, V-V, H-H and U-U refer to the following detailed illustrations. The definition of upper, rear, front and lower connecting elements is by way of example. Thus, all illustrated connecting elements can, according to respective requirements, be used all adjoining parts at all locations.

FIG. 4 shows, in a sectional illustration O-O, a first variant of embodiment of the connecting element 18 as upper connecting element 32, such as is usable in the lightweight glass plate 10 of FIG. 3. The upper connecting element 32 includes a first region 18.1, which is embedded in the intermediate layer 13. This first region 18.1 is, for example, positioned in the intermediate space before filling with the tastable resin of the intermediate layer 13. In the example, a sealing material 14, which at the same time fixes and positions the upper connecting element 32, is additionally introduced at the edge of the lightweight glass plate 10. The sealing material 14 protects the edges of the intermediate layer 13 and prevents penetration of moisture into the intermediate layer 13 or into the boundary region between intermediate layer and glass plates 11, 12.

The intermediate layer 13 or the spacing between the two glass plates 11, 12 is dimensioned in such a manner that the intermediate layer material can penetrate into the space or a residual intermediate layer X31 between the first region 18.1 of the upper connecting element 32 and the two glass plates 11, 12. The intermediate layer 13 can extend on areas between the upper connecting element 32 and the glass plates 11, 12. The residual intermediate layer X31 has a thickness of at least approximately 0.5 millimeters. A good area coverage can thus be achieved. In practice, a thickness of the residual intermediate layer X31 of approximately 1.0 millimeter is desired. Tolerance for inaccuracies in the upper connecting element 32 can thereby be provided.

In the case of the upper connecting element 32 shown in FIG. 4 the first region is provided with a perforation. The castable resin of the intermediate layer 13 fills up these perforations and improves the transmission of force from the upper connecting element 32 to the lightweight glass plate 10. The perforation density in that case decreases in direction towards the glass edge. This results in an optically pleasing transition from the completely transparent region to the non-transparent connecting zone and a force build-up in the upper connecting element 32 takes place continuously.

In the example according to FIG. 4 an intermediate layer thickness X3 of the intermediate layer 13 is approximately 75% of the glass plate thickness X1, X2 of one of the glass plates 11, 12. The two glass plates 11, 12 are selected to be of the same thickness and the residual intermediate layer X31 between the glass plate 11, 12 and the upper connecting element 32 is approximately 50% of a material thickness X32 of the upper connecting element 32. A typical material thickness X32 of the connecting element 32 is 1.5 millimeters. The intermediate layer thickness X3 of the intermediate layer 13 is, in the example, thus approximately 3.0 millimeters. A glass plate thickness X1, X2 of the individual glass plates 11, 12 is approximately 4.0 millimeters. An overall thickness X0 of the lightweight glass plate 10 of approximately 11.0 millimeters thus results.

The upper connecting element 32 is provided with support rollers 28. This lightweight glass plate 10 is used as an elevator door and the rollers 28 enable lateral displacement of the elevator door along a roller path. The support rollers 28 are preferably arranged in correspondence with a center-of-gravity line 42 of the lightweight glass plate 10 and the elevator door leaf is thus suspended symmetrically. The upper connecting element 32 is produced integrally. The support rollers 28 are fastened directly to this upper connecting element 32.

The solutions illustrated in FIG. 4 in the example of the upper connecting element 32 are, in principle, usable for all connecting elements 18. The individual aspects, such as construction of the first region 18.1 with perforations, dimensions and dimensional relationships, use of a sealing material 14, etc., are exchangeable or combinable with the solutions of the following examples.

FIG. 5 shows in a further sectional illustration O-O another variant of embodiment of the connecting element 18 as an upper connecting element 32, such as is usable in the lightweight glass plate 10 of FIG. 3. The construction of the lightweight glass plate 10 substantially corresponds with the construction as explained in FIG. 4. By contrast therewith, the upper connecting element 32 is of multi-part construction. A support plate or carrier plate 43, which in turn can include further elements such as door rollers 28, is fastened to the upper connecting element 32 by means of detachable connections 29, for example screws. The upper connecting element 32 is in turn anchored by its first region 18.1 in the intermediate layer 13 of the lightweight glass plate 10.

In a further difference, instead of apertures in the example according to FIG. 4, printings are provided in the first region 18.1. These printings form elevations on one side of the material and corresponding depressions on the other side of the material. A good transmission of force from the intermediate layer 13 to the upper connecting element 32 can thus be achieved. In a further difference, the glass plates 11, 12 are of asymmetrical construction. A glass plate thickness X2 of the second glass plate 12 is, by comparison with the glass plate thickness X1 of the first glass plate 11, formed to be thinner, for example half as thick. The intermediate layer thickness X3 of the intermediate layer 13 approximately corresponds with the glass plate thickness X1 of the first glass plate 11. In order to ensure sufficient coverage of the elevations in the first region 18.1 of the upper connecting element 32 the intermediate layer 13 is so dimensioned that a sufficient residual intermediate layer X31 results. Advantageously, the thicker first glass plate 11 faces a more highly loaded side of the lightweight glass plate 10.

The individual solutions according to FIG. 5 are examples and they can be exchanged or combined with the solutions of the preceding and following examples.

FIG. 6 shows in a further sectional illustration O-O a further variant of embodiment of the connecting element 18 as upper connecting element 32 or of a corresponding lightweight glass plate 10. In this regard, the second glass plate 12 is arranged to be set back relative to the first glass plate 11 at least in one of the edge regions and the upper connecting element 32 has a limb 18.1, 18.3, which projects into the intermediate layer 13, and the upper connecting element 32 further includes a head part 18.4. The head part 18.4 fills out the space which arises essentially as a result of the set-back second glass plate 12. The head part 18.4 preferably includes elements, such as a thread 19, for connection of further parts. This construction makes possible particularly aesthetic arrangements of lightweight glass plates 10. A support plate or carrier plate 43, such as illustrated in FIG. 5, can, for example, be attached to this head part 18.4.

The individual solutions according to FIG. 6 are also examples and they can all be exchanged or combined with the solutions of the preceding and the following examples.

FIG. 7 shows, in a sectional illustration V-V a possible variant of embodiment of the connecting element as a front connecting element 30, such as is advantageously usable in an elevator door. This front connecting element 30 in turn includes a first region 18.1 which, as explained in the foregoing on the basis of the upper connecting element, is embedded in the intermediate layer 13.

The front connecting element 30 includes a further region 18.2, which extends over the entire thickness of the lightweight glass plate 10 and which conceals a corresponding edge of the lightweight glass plate 10. This further region 18.2 includes, on the side remote from the lightweight glass plate 10, a mount, for example in the form of a dovetail. Additional elements or connecting elements for further components can be fastened in this mount. An additional element of that kind is, for example, a door edge protector in the form of a rubber strip or a brush structure.

In one embodiment this additional element is a sensor strip 34. This sensor strip 34 includes a sensor system for detecting obstacles in the door region. Obstacles can in that case be detected by way of force detectors, infrared pick-ups, ultrasonic detectors, induction field sensors, capacitive measuring systems, photocells or light-grating barrier sensors. The sensor strip 34 communicates with a corresponding door control, which controls the elevator door. Alternatively or additionally the additional element can also include a warning transmitter 35. This can be, for example, a warning light which lights up or flashes during closing. The warning transmitter 35 can also include vibration elements which in the case of gentle pressure, for example, when a door is blocked by a user, vibrate. Buzzers or tone elements can also be integrated in this additional element.

In a further additional or alternative embodiment light elements can also be embedded in the intermediate layer 13. Thus, entire lightweight glass plate areas can, for example, during closing, light up in a color tone or flash.

These embodiments of the front connecting element 30 are also examples and they can be exchanged or combined with the solutions of the preceding and following examples.

FIG. 8 shows a further possible variant embodiment of the connecting element 18 as a front connecting element 30. This front connecting element 30 again includes a first region 18.1 which, as already explained, is embedded in the intermediate layer 13. The front connecting element 30 includes the further region 18.2, which in this exemplifying embodiment extends over the entire thickness of the lightweight glass plate 10 and which surrounds the corresponding edge of the lightweight glass plate 10. Edges of the lightweight glass plate 10 are in this regard protected at the whole circumference.

FIG. 9 shows in a sectional illustration H-H a variant of embodiment of the connecting element 18 as a rear connecting element 31, such as is usable, by way of example, in an elevator door. The connecting element 31 again includes the first region 18.1 which, as already explained in several variants, is embedded in the intermediate layer 13. The further region 18.2 now extends on one side of the lightweight glass plate 10 up to the edge of the glass plate 11. An opposite end of the further region 18.2 projects out beyond the lightweight glass plate or the glass plate 12. This projecting part covers, for example, a gap 38 which arises between a wall 37 at the building side and the lightweight glass plate 10. Penetration of air or wind can thereby be reduced or, in the case of use of appropriate sealing lips (not illustrated) even be prevented. This is useful primarily in elevators with an open shaft, i.e. when shaft walls 7 are partly absent.

FIG. 10 shows a variant of embodiment of the connecting element 18 such as can be used as a rear connecting element 31 or at any position. The rear connecting element 31 includes the first region 18.1 which, as already explained in several variants, is directly embedded in the intermediate layer 13. The rear connecting element 31 serves in this embodiment not for connection of further elements, but it closes off the lightweight glass plate 10. In this embodiment it serves as a reinforcing zone, which, for example, can transmit force to adjoining upper or lower connecting elements 32, 33.

Figure 11:
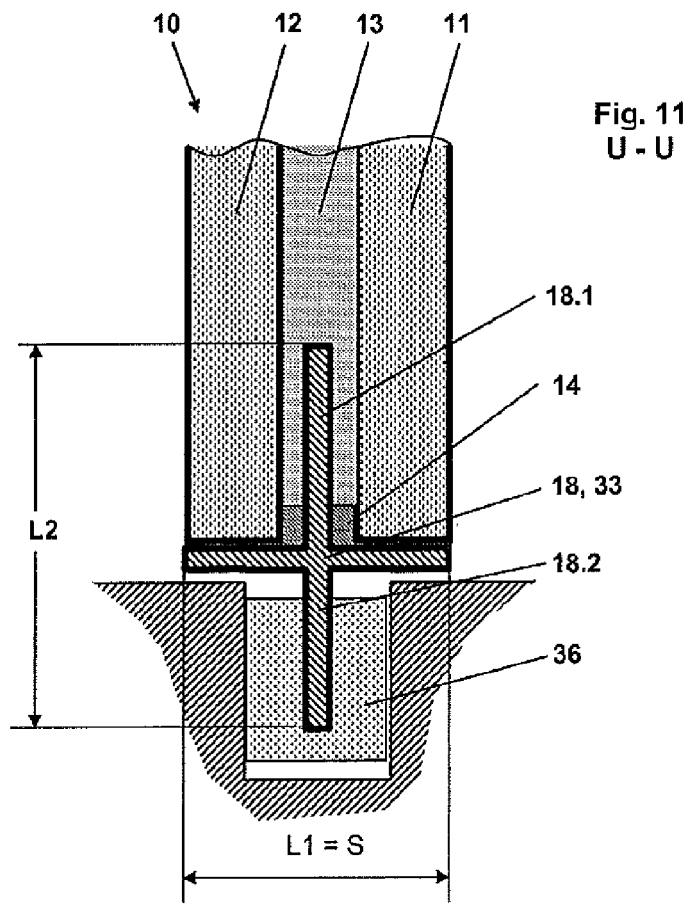
FIG. 11 shows a first example of a lower connecting element, element.

FIG. 11 shows, in a sectional illustration U-U, a possible variant of embodiment of the connecting element 18 in a use as a lower connecting element 33, such as is suitable, for example, for sliding guidance of an elevator door. The connecting element 33 forms a substantially cross-like symmetrical profile, wherein a short length L1 of the cross-like profile corresponds with a total thickness S of the lightweight glass plate 10 and a long length L2 of the cross-like profile corresponds with 1.5 to 3 times the total thickness S of the lightweight glass plate 10. The first region 18.1 of the connecting element 33 is, as already explained in several variants, embedded in the intermediate layer 13. The cross-region covers the lightweight glass plate 10 over the entire thickness thereof and thereby protects it from damage. The further region 18.2 is provided with a slide-guidance covering 36, for example a felt slider or a plastics material slider. The lightweight glass plate 10 is now slidingly guidable. This basic form of the connecting element 33 is also usable for all edge regions of the lightweight glass plate 10 as required.

Figure 12:
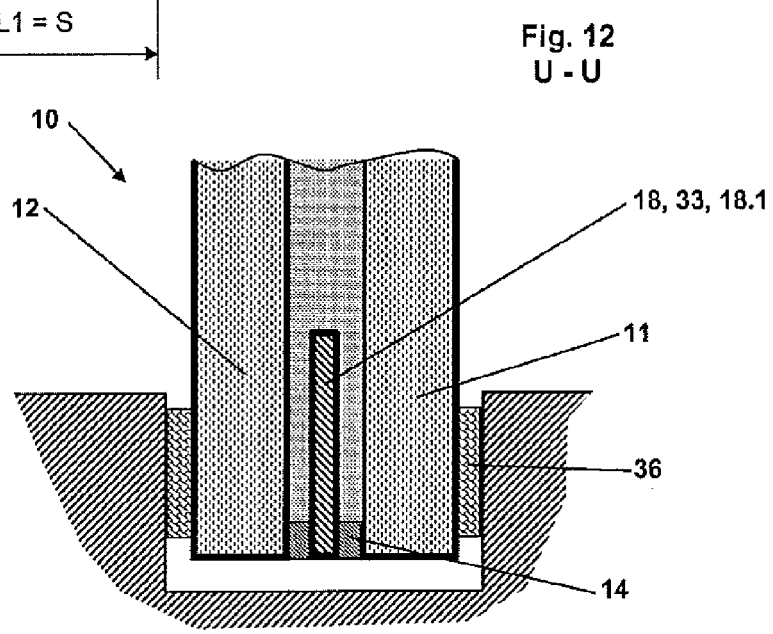
FIG. 12 shows a second example of a lower connecting element.

FIG. 12 shows another possible variant of embodiment of a lower connecting element 33 such as is similarly suitable for sliding guidance of the elevator door. This variant of embodiment is based on the embodiments explained in FIG. 10. For the purpose of guidance of the lightweight glass plate 10 the slide-guidance covering 36 is here now additionally fastened, preferably glued, directly to the glass plate 11 or the glass plate 12.

The connecting elements 18 shown in FIGS. 4 to 12 are made of solid materials, Use is preferably made of metallic materials, for example stainless steel sheet, aluminum or also brass. Plastics materials are also possible. The connecting elements illustrated in FIGS. 6, 7, 8, 9 and 11 are advantageously produced as drawn or pressed profile members, whilst the remaining connecting elements are advantageously produced of sheet material, for example bent and punched.

Figure 13:
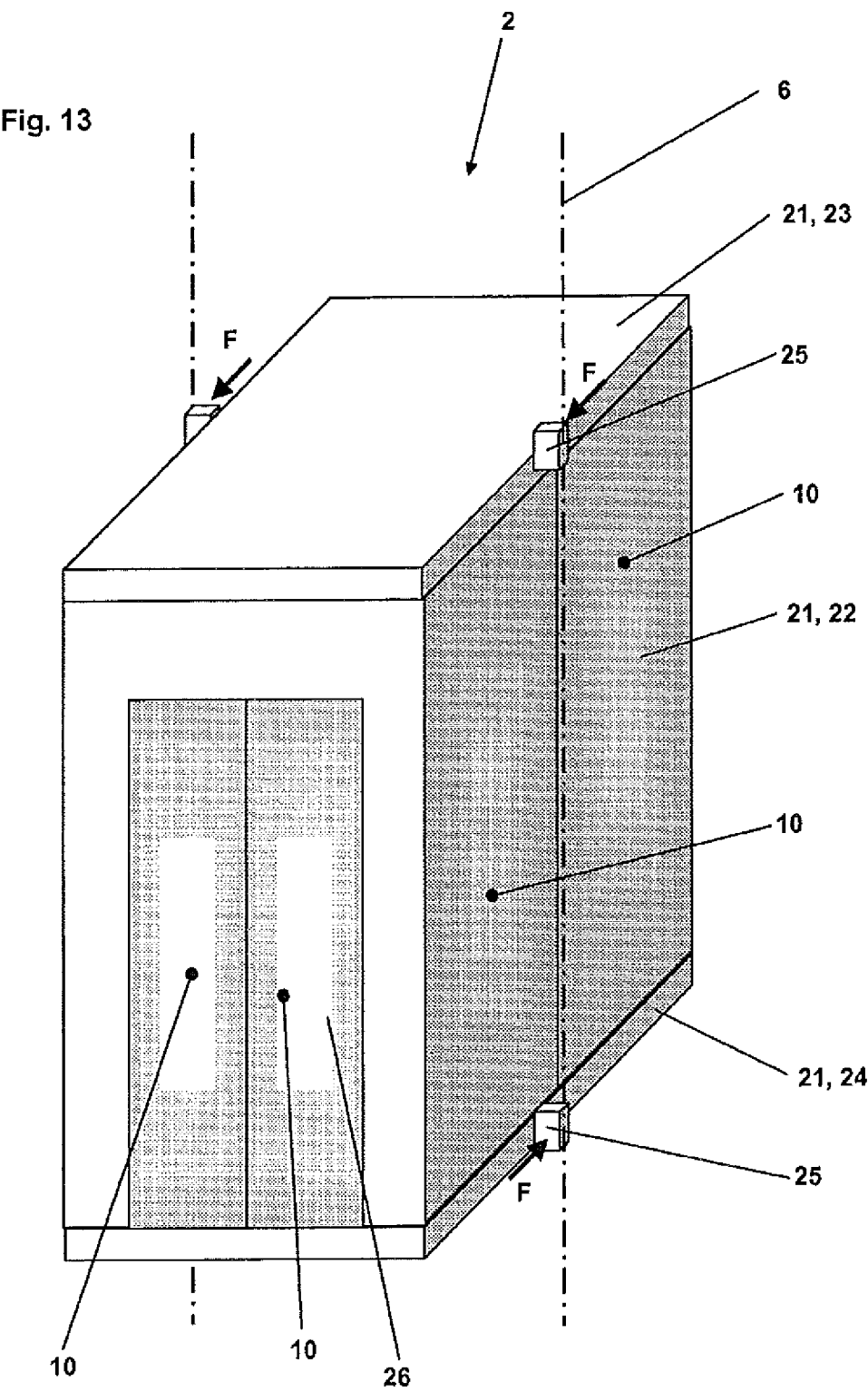
FIG. 13 shows a perspective view of an elevator car.

FIG. 13 shows an elevator car 2 such as is usable in the elevator according to FIG. 1. The car 2 is provided at one side with two car doors 26. The illustrated car door is a centrally opening car door in which two doors are, for closing, moved towards one another until they approach or are hit by the front regions thereof in the illustrated center position. For opening, the car doors are correspondingly displaced away from one another. Other single-leaf or multi-leaf door systems are also possible.

The car 2 is in addition closed by car walls 21. A first car wall 21 is constructed as a car floor 24. Connected with the car floor 24 are lateral car walls 22 which laterally bound the car space. The car is bounded upwardly by a car ceiling 23. The car is provided with guide means 25 which guide the car 2 along the guide rail 6.

In the illustrated example the two doors of the car door 26 are each made of a lightweight glass plate 10 and the lateral car walls 22 are assembled from several lightweight glass plates 10. The lightweight glass plates 10 are constructed in correspondence with the exemplifying embodiments of FIGS. 4 to 12. The lightweight glass plates 10 are shear-resistant. This means that shear forces F, which can result due to, for example, eccentric loading of the car 2 and which produce a corresponding shear force pair F, can be substantially transmitted through the glass plates 10.

A car 2 constructed in that manner is light by comparison with a conventional glass car, since the intermediate layer 13, which is employed, of the lightweight glass plates 10 has merely approximately 50% of the weight of a corresponding glass volume and since it is possible to dispense with heavy and complicated frame constructions. In addition, the car doors 26 are themselves comparatively light, whereby movement energy can be minimized or closing speed can be optimized.

Figure 14:
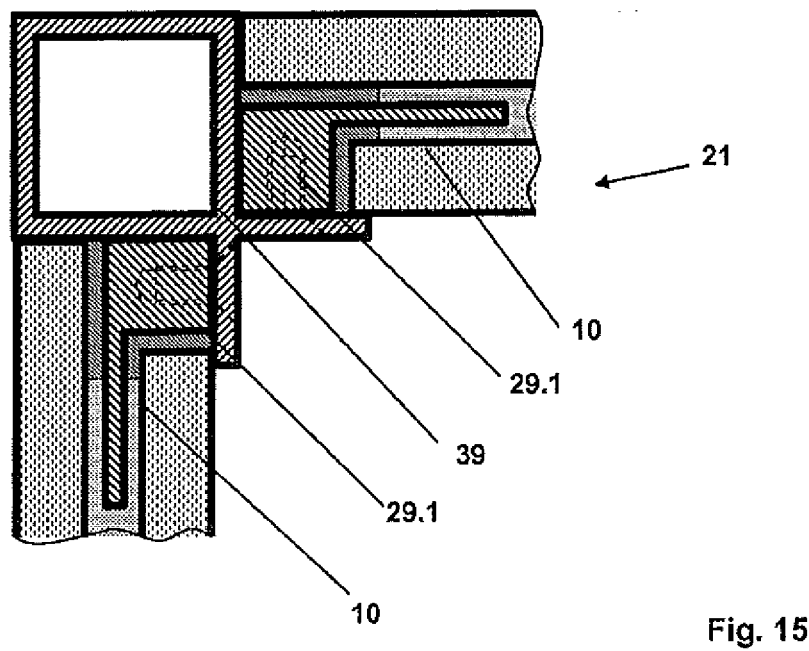
FIG. 14 shows an example of a corner connection of lightweight glass plates.
Figure 15:
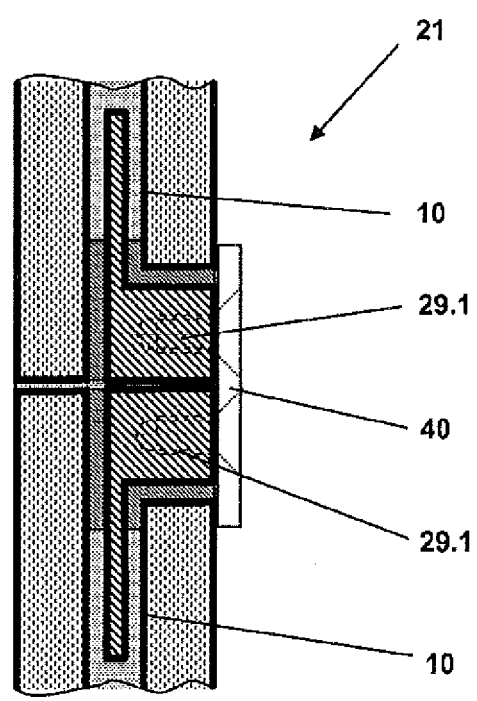
FIG. 15 shows an example of an area connection of lightweight glass plates.

FIGS. 14 and 15 show examples for connecting lightweight glass plates 10 to form car walls 21. The lightweight glass plates 10 used are provided with connecting elements 18 similar to the embodiment of FIG. 6. Instead of the connecting thread 29 at the end, lateral threads 29.1 are provided in the head part of the connecting element 18. In FIG. 14, two lightweight glass plates 10 are joined together by means of corner connectors 39 to form a car corner and in FIG. 15 two lightweight glass plates 10 are joined together by means of area connectors 40 to form a car wall 21. A car 2 can be assembled appropriate to requirements by way of connecting means of that kind.

Figure 16:
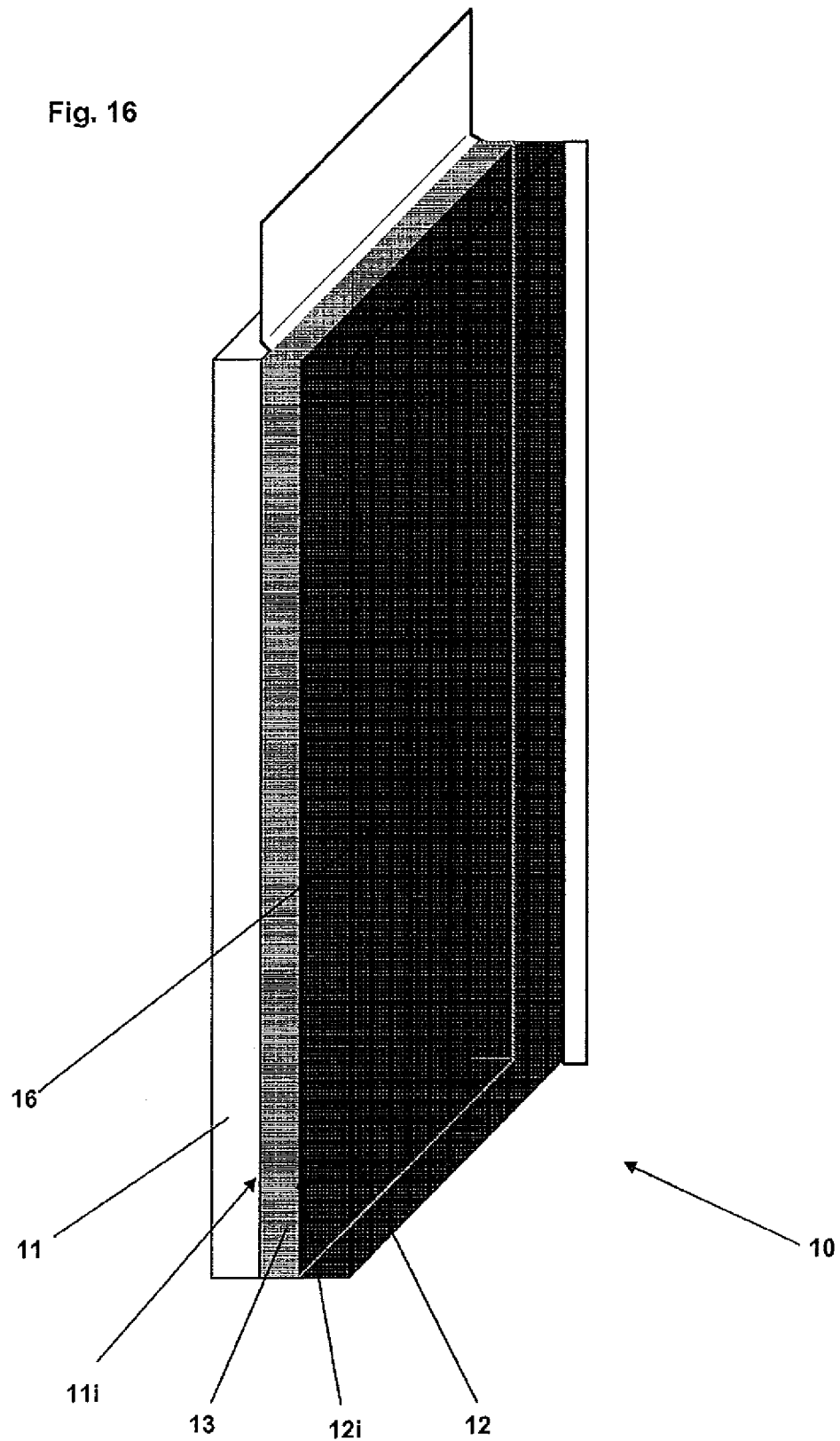
FIG. 16 shows an example of a printed lightweight glass plate.

FIG. 16 shows a lightweight glass plate 10 which is usable as an elevator door 26. The lightweight glass plate 10 is again constructed as described in the preceding figures. It includes, in particular, an image or writing 16, which is placed in the intermediate layer 13. This writing 16 is applied permanently. In support of this example it is possible, if required additionally to or instead of the writing 16, to introduce objects into the intermediate space 13 or to apply them on inner sides 11*i*, 12*i* of the two glass plates 11, 12. Objects of that kind can be screen prints or surface etchings, which are applied or carried out at the inner surfaces 11*i*, 12*i* of the glass plates 11, 12. If objects of that kind are applied to both inner surfaces, three-dimensional effects can be produced. Objects such as image sculptures, illuminated letters or air bubbles can also be incorporated in the intermediate layer 13.

Figure 17:
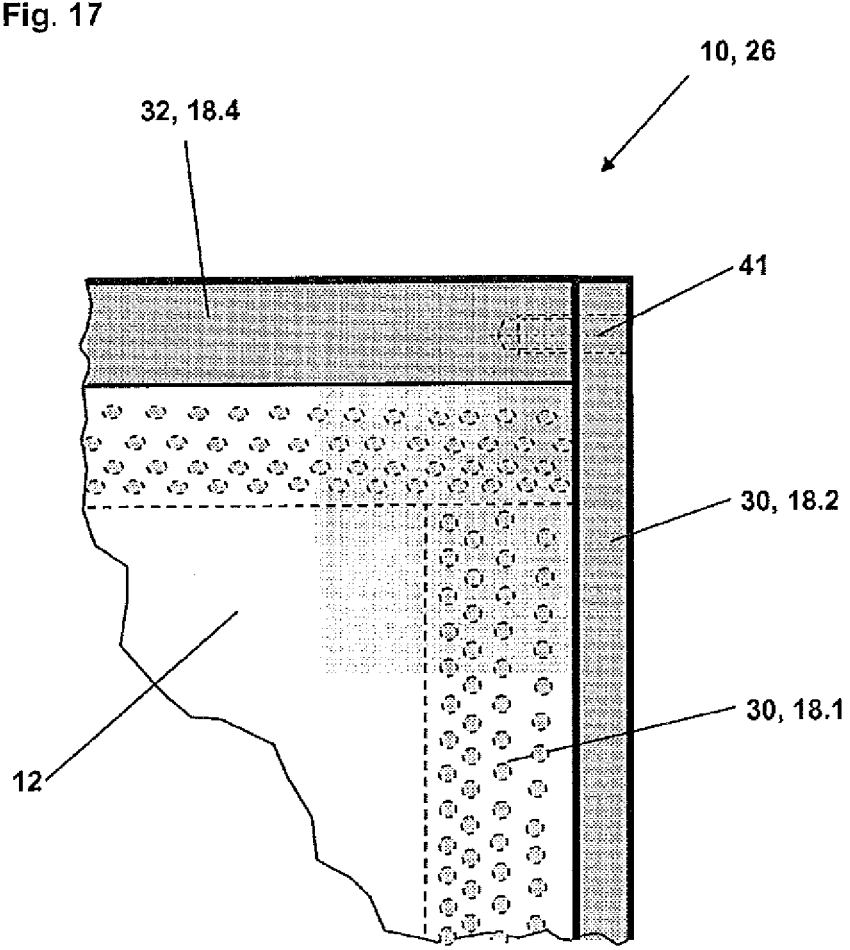
FIG. 17 shows an example of a friction-coupling corner connection.

FIG. 17 shows, by way of example, a corner detail of the lightweight glass plate 10, such as can be used for an elevator door 26. The lightweight glass plate 10 corresponds, with respect to the upper connecting element 32, with the embodiment similarly as described in FIG. 6. The illustrated front connecting element 30 corresponds with an embodiment, corresponding with the example of FIG. 7, wherein the first region 18.1 of the front connecting element 30 is cut away in the region of the upper connecting element 32 and merely the further region 18.2 of the front connecting element 30 is led upwardly.

This upwardly led further region 18.2 of the front connecting element 30 is connected at the end with the head part 18.4 of the upper connecting element 32, preferably with use of an end thread 41 with associated countersunk screw. The friction-coupling connection of two connecting elements 30, 32 in the corner region relieves the actual glass plates of load, since forces are conducted directly by way of the connecting elements 30, 32.

With knowledge of the present invention the elevator expert can vary the set shapes and arrangements. The shapes of the connecting element 18 are determinable appropriately to need. For example, the illustrated elevator plate 10 can also be used as a car ceiling or car floor. The glass plates can also have a shape such as, for example, a round shaping for the corner region of the car. The embodiments, which are shown in FIGS. 4 and 5, of the first region 18.1, as also the examples for shaping of the glass plates 11, 12 and the intermediate layer 13, can be combined with the remaining examples of use. In addition, the solutions shown on the basis of examples for the elevator door can be usefully also employed for car wall constructions or conversely. The glass structure can also be shaped. A glass structure can thereby, for example, extend over a corner of the car.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator installation with a car having a car door and with shaft doors cooperating with the car door, and including a lightweight glass plate forming at least a portion of one of the shaft doors, the car door, a car wall, a car ceiling and a car floor, the lightweight glass plate comprising:
    a first glass plate with a first glass plate thickness and a first edge;
    a second glass plate with a second glass plate thickness and a second edge, the second edge aligned with the first edge to form a common plane;
    an intermediate layer which directly connects the first and the second glass plates together, the intermediate layer being formed of a material other than glass;
    at least one connecting element, wherein the first and second glass plates are positioned in parallel spaced planes forming an intermediate space therebetween and the intermediate layer substantially fills out the intermediate space between the first and second glass plates, wherein a thickness of the intermediate layer is at least equal to half of one of the first and second glass plate thicknesses, wherein the connecting element is embedded only in an edge region of the lightweight glass plate in the intermediate layer, and wherein the intermediate layer penetrates into a space between the connecting element and the first and second glass plates; and
    a sealing material attached to both the first and the second glass plates within the edge region of the intermediate space not occupied by the intermediate layer, the connecting element extending through the common plane and the sealing material and into the intermediate layer.

2. The elevator installation according to claim 1 wherein the connecting element is formed of a metallic material and has a first region which is embedded in the intermediate layer, the connecting element having a further region which is configured for connection with an adjoining component, and the first region has a structure which ensures a force connection from the connecting element to the intermediate layer.

3. The elevator installation according to claim 1 wherein the lightweight glass plate includes an optically visible image, writing or object in the intermediate layer, or applied to at least one of the first and second glass plates.

4. The elevator installation according to claim 1 wherein the second glass plate is set back relative to the first glass plate in an edge region, the connecting element includes a limb that protrudes into the intermediate layer, the connecting element includes a head part which substantially fills a space created by the set back of the second glass plate, and the head part includes connection elements configured for connecting to another part of the elevator installation.

5. The elevator installation according to claim 1 wherein the lightweight glass plate forms at least a part of a car wall, a car ceiling and a car floor of the car.

6. The elevator installation according to claim 1 wherein the lightweight glass plate is a load-bearing structure of a car floor and forces applied to the car floor are conducted by the lightweight glass plate from the car floor into upper car guide means.

7. The elevator installation according to claim 1 wherein a car door or a shaft door includes the lightweight glass plate having the connecting element with a first region thereof embedded in the intermediate layer and a door element fastened to a further region of the connecting element.

8. The elevator installation according to claim 1 wherein the connecting element is a front connecting element having a further region at a front edge of the lightweight glass plate and extending over an entire thickness of the lightweight glass plate, the front connecting element including a sensor for detection of an object or a person in the region of the front edge for sensing a force applied to the front edge or detecting an object adjacent the front edge.

9. The elevator installation according to claim 8 wherein the front connecting element has a round edge in order to prevent harm to contacting objects and persons.

10. The elevator installation according to claim 8 wherein the front connecting element has warning elements to warn a user when the lightweight glass plate is moving.

11. The elevator installation according to claim 1 wherein the lightweight glass plate includes a rear connecting element having a first region embedded in the intermediate layer and a further region projecting beyond an exterior surface of one of the first and second glass plates and cooperating with one of an adjacent door leaf or an adjacent door frame forms a cover which at least optically closes a gap between the lightweight glass plate and the adjacent door leaf or the adjacent door frame.

12. The elevator installation according to claim 1 wherein the at least one connecting element is an upper connecting element and including at least one of a front connecting element and a rear connecting element frictionally coupled with the upper connecting element.

13. A lightweight glass plate forming at least a portion of one of an elevator shaft door, an elevator car door, an elevator car wall, an elevator car ceiling and an elevator car floor comprising:
   a first glass plate with a first glass plate thickness and a first edge;
   a second glass plate with a second glass plate thickness and a second edge, the second edge aligned with the first edge to form a common plane;
   an intermediate layer which directly connects the first and the second glass plates together, the intermediate layer being formed of a material other than glass; and
   at least one connecting element, wherein the first and second glass plates are positioned in parallel spaced planes forming an intermediate space therebetween and the intermediate layer substantially fills out the intermediate space between the first and second glass plates, wherein a thickness of the intermediate layer is at least equal to half of one of the first and second glass plate thicknesses, wherein the connecting element is embedded only in an edge region of the intermediate layer, and wherein the intermediate layer penetrates into a space between the connecting element and the first and second glass plates; and
   a sealing material attached to both the first and the second glass plates within the edge region of the intermediate space not occupied by the intermediate layer, the connecting element extending through the common plane and the sealing material and into the intermediate layer.

14. The lightweight glass plate according to claim 13 including at least one perforation formed in a first region of the connecting element, the first region extending into the intermediate layer and the intermediate layer filling the at least one perforation.

15. The lightweight glass plate according to claim 13 wherein the connecting element is formed of a metallic material and has a first region which is embedded in the intermediate layer, the connecting element having a further region which is configured for connection with an adjoining component, and the first region has a structure which ensures a force connection from the connecting element to the intermediate layer.

16. The lightweight glass plate according to claim 13 wherein the lightweight glass plate includes an optically visible image, writing or object in the intermediate layer, or applied to at least one of the first and second glass plates.

* * * * *